United States Patent Office 3,646,233
Patented Feb. 29, 1972

3,646,233
REACTION OF PARAFFINS WITH
ADAMANTANE COMPOUNDS
Robert E. Moore, Wilmington, Del., assignor to
Sun Oil Company, Philadelphia, Pa.
No Drawing. Continuation-in-part of application Ser. No. 877,004, Nov. 14, 1969. This application Oct. 14, 1970, Ser. No. 80,779
Int. Cl. C07c 3/54
U.S. Cl. 260—666 M                     19 Claims

ABSTRACT OF THE DISCLOSURE

Saturated adamantane hydrocarbons of the $C_{10}$–$C_{19}$ range having 0–3 alkyl substituents and/or their corresponding adamantanols are reacted with $C_3$–$C_{20}$ n-paraffins and/or with certain types of $C_4$–$C_{20}$ isoparaffins by contacting a mixture of such reactants with sulfuric acid having a strength of 96–105% $H_2SO_4$ equivalent at a temperature between the freezing point of the acid and 100° C., more preferably 10–75° C. This causes a $C_3$–$C_{20}$ alkyl or alkylene moiety, derived from and having the same number of carbon atoms as the n-paraffin used, to become attached to the adamantane nucleus. As a result two types of products are obtained: (1) alkylated adamantane hydrocarbon having one adamantane nucleus per molecule with the $C_3$–$C_{20}$ alkyl moiety as a bridgehead substituent; and (2) bis-type hydrocarbon product having two adamantane nuclei linked between bridgehead positions through the $C_3$–$C_{20}$ alkylene moiety. Both types of products are particularly suitable as components of traction fluids.

CROSS REFERENCES TO RELATED APPLICATIONS

This application is a continuation-in-part of my copending application Ser. No. 877,004, filed Nov. 14, 1969, now abandoned.

My copending application Ser. No. 784,487, filed Dec. 17, 1968, discloses and claims the preparation of bridgehead monools in high yields from alkyladamantanes by dissolving an alkyladamantane at a temperature below 50° C. in fuming sulfuric acid having a strength above 102% $H_2SO_4$ equivalent and then reacting the mixture with water to form a bridgehead monool corresponding to the starting alkyladamantane.

My copending application Ser. No. 807,946, filed Mar. 3, 1969, now U.S. Pat. 3,546,308, issued Dec. 8, 1970, describes a process wherein hydroxyadamantane compounds are alkylated by reaction with aliphatic alcohols or monoolefins in the presence of strong sulfuric acid and alkyladamantane hydrocarbons are recovered as the reaction product.

Application Ser. No. 823,138, filed May 8, 1969, by Abraham Schneider and having common ownership with the present application, and now U.S. Pat. 3,560,578 issued Feb. 2, 1971, discloses a reaction for linking adamantane nuclei between bridgehead positions through a trimethylene or tetramethylene radical. The procedure involves reacting the admantane hydrocarbon with a propyl or butyl chloride or bromide using $AlCl_3$ or $AlBr_3$ as catalyst under homogeneous conditions. Bis-type products are obtained which mainly have one or two halogen atoms per molecule, but a minor amount of bis-type hydrocarbon usually is produced comprising adamantane nuclei connected through an unbranched $C_3$ or $C_4$ alkylene linkage.

In application Ser. No. 56,680, filed July 20, 1970, by Robert E. Moore and Abraham Schneider, a process is disclosed whereby alkyladamantanes and/or alkyladamantanols of the $C_{12}$–$C_{19}$ range containing 1–3 alkyl groups of the $C_1$–$C_3$ range are converted to hydrocarbon dimers in which two adamantane nuclei are linked to each other through an alkylene radical derived from and having the same number of carbon atoms as an alkyl group of the starting material. The reaction is effected by contacting the starting material with sulfuric acid having a strength in the range of 94–102% $H_2SO_4$ in the absence of any other reactant material. When dimethyladamantanes or ethyldimethyladamantanes or their monools are used, products are also produced which are like the dimers except that the adamantane nuclei are also joined through an ether linkage.

BACKGROUND OF THE INVENTION

This invention relates to the reaction of normal paraffin and/or isoparaffin hydrocarbons with saturated $C_{10}$–$C_{19}$ adamantane hydrocarbons having 0–3 alkyl substituents and/or corresponding adamantanols in the presence of strong sulfuric acid. The reaction effects alkylation of the adamantane nucleus to produce higher alkyladamantanes and it also produces compounds having two adamantane nuclei linked through an alkylene group derived from the paraffin hydrocarbon reactant. For convenience, these linked compounds are herein referred to as "bis-type" products.

The adamantane nucleus has ten carbon atoms, four of which are bridgehead carbons that are equivalent to each other, as can be seen from the following typographical representation:

As shown, the bridgehead carbon atoms customarily are designated by the numerals 1, 3, 5 and 7 respectively, and these bridgehead positions are all equivalent to each other in the nuclear structure.

Starting materials for the present process include adamantane, 1- or 2-adamantanol, alkyladamantanes of the $C_{11}$–$C_{19}$ range having 1–3 alkyl substituents and/or the corresponding $C_{11}$–$C_{19}$ alkyladamantanols. When any of the adamantanols are used, the hydroxy group can be located at either bridgehead or nonbridgehead positions.

The preparation of methyl- and/or ethyl-substituted adamantanes by the isomerization of tricyclic naphthenes by means of an aluminum halide or $HF$–$BF_3$ catalyst has been described by several references including the following: Schneider U.S. Pat. No. 3,128,316, dated Apr. 7, 1964; Janoski and Moore U.S. Pat. No. 3,275,700, dated Sept. 27, 1966; Schneider et al. U.S. Pat. Nos. 3,336,405 and 3,336,406, dated Aug. 15, 1967; Schneider U.S. Pat. No. 3,356,751, dated Dec. 5, 1967; Schleyer et al., Tetrahedron Letters No. 9, pps. 305–309 (1961); and Schneider et al., JACS, 86 pps. 5365–5367 (1964). The isomerization products can have the methyl and/or ethyl groups attached to the adamantane nucleus at either bridgehead or nonbridgehead positions or both, although completion of the isomerization reaction favors bridgehead substitution. Examples of alkyladamantanes made by such isomerization are dimethyladamantanes, ethyladamantanes, methylethyladamantanes, dimethylethyladamantanes and trimethyladamantanes.

Preparations of adamantane hydrocarbons having $C_3$ or higher alkyl substituents have been described in the following references: Schneider U.S. Pat. No. 3,382,288, dated May 7, 1968; Capaldi U.S. Pat. No. 3,437,701, dated Apr. 8, 1969; and Spengler et al., Erdöl und Kohle-Erdgas-Petrochemie, vol. 15, pp. 702–707 (1962).

Procedures for converting adamantane hydrocarbons to bridgehead hydroxy derivatives have been described in the prior art. Schneider U.S. Pat. No. 3,356,740, dated Dec. 5, 1967, discloses the conversion of alkyladamantanes to bridgehead alcohols by air oxidation using a soluble metallic organic salt as catalyst, as also does Schneider U.S. Pat. No. 3,450,775, dated June 17, 1969. Moore U.S. Pat. No. 3,383,424, dated May 14, 1968, shows the oxidation of alkyladamantanes by means of chromic acid in aqueous acetic acid under conditions to produce either monools or diols.

The preparation of nonbridgehead adamantanols containing nonbridgehead alkyl groups from adamantanone and their conversion to the corresponding nonbridgehead alkyladamantanes have been described by Landa et al., Collection Czechoslov. Chem. Commun., vol. 32 (1967).

Alkyladamantanols in which the hydroxy group is at a nonbridgehead position can be made similarly from keto derivatives of alkyladamantanes which are obtained as by-products of the air oxidation process disclosed in aforesaid Schneider U.S. Pat. No. 3,356,740. Conversion of the keto group can be carried out by a Grignard synthesis in the manner described in the aforesaid Landa et al. reference or by Schleyer et al., JACS, 83, 186, which shows the reaction of adamantanone with methyl iodide and magnesium to yield 2-methyladamantanol-2. In analogous fashion the keto by-products of U.S. Pat. No. 3,356,740 can be converted to nonbridgehead alkyladamantanols also having at the nonbridgehead position an ethyl, n-propyl or isopropyl substituent in addition to the alkyl substituents that were present in the starting alkyladamantane hydrocarbon.

In the prior art, the preparation of two bis-type adamantane hydrocarbons having an ethylene linkage between the nuclei has been described by Stepanov and Baklan, J. Gen. Chem. USSR, vol. 34(2), pages 580-584 (1964). Specifically, these compounds were 1,2-bis(adamantyl-1)-ethane and 1,2-bis(1-methyladamantyl-3)-ethane, both being high melting solids having melting points, respectively, of 289° C. and 153° C. They were made from 1-hydroxymethyladamantane by classical synthesis techniques involving Grignard reactions, the reaction routes being entirely different from reactions which occur in the process of the present invention.

The aforesaid Schneider U.S. Pat. No. 3,382,288 discloses a process for alkylating adamantane hydrocarbons by means of aliphatic alcohols or olefins using strong sulfuric acid as catalyst. The reaction also was shown to produce minor amounts of bis-type alkyladamantane products.

SUMMARY OF THE INVENTION

The present invention provides a way of reacting paraffin hydrocarbons of the $C_3$–$C_{20}$ range, as hereinafter more fully specified, directly with $C_{10}$–$C_{19}$ adamantane hydrocarbons or corresponding adamantanols or mixtures thereof, whereby a $C_3$–$C_{20}$ hydrocarbon moiety becomes attached to the adamantane nucleus.

According to the invention, saturated adamantane hydrocarbons of the $C_{10}$–$C_{19}$ range having 0–3 alkyl substituents and/or adamantanols corresponding thereto are reacted with one or more n-paraffins of the $C_3$–$C_{20}$ range and/or isoparaffins of the $C_4$–$C_{20}$ range as hereinafter specified, by contacting a mixture consisting essentially of these reactants with strong sulfuric acid having a strength in the range of 96–105% $H_2SO_4$ equivalent by weight, more preferably 98–104% $H_2SO_4$. The temperature of contacting is between the freezing point of the sulfuric acid and 100° C., more preferably in the range of 10–75° C. The contacting is continued until at least substantial reaction between the paraffin reactant and the adamantane feed compound has occurred. Thereafter there is recovered from the reaction mixture a hydrocarbon product containing at least one of the following products:

(1) Alkylated adamantane hydrocarbon corresponding to the adamantane feed compound but having attached to a bridgehead position of the adamantane nucleus an alkyl group derived from and having the same number of carbon atoms as the paraffin hydrocarbon used, and (2) Bis-type hydrocarbon product comprising two adamantane nuclei linked to each other between bridgehead positions through an alkylene group derived from and having the same number of carbon atoms as the paraffin hydrocarbon used.

Generally both types of products can be produced in substantial yields. They can be recovered in admixture with each other, such mixture being particularly useful as a component of traction fluids. Alternatively each type of product can be recovered separately, e.g., by distillation, and the individual products likewise have utility in traction fluid compositions.

Preferred products for use as traction fluid components are those made from $C_5$–$C_8$ paraffins and $C_{12}$–$C_{14}$ alkyladamantanes or alkyladamantanols in which the alkyl substituents are methyl and/or ethyl.

DESCRIPTION

The adamantane compound used as starting material for the present process can be any saturated adamantane hydrocarbon of the $C_{10}$–$C_{19}$ range having 0–3 alkyl substituents or any corresponding adamantanol with the hydroxy group located at either a bridgehead or nonbridgehead position. Mixtures of such hydrocarbons or such adamantanols or both can be employed if desired. Alkyl groups in the alkyladamantanes or alkyladamantanols can be located at bridgehead or nonbridgehead positions or both and mainly will remain in the same position on the adamantane nucleus throughout the reaction. These alkyl substituents can range from methyl to nonyl, with the total number of alkyl carbon atoms per molecule not exceeding nine.

Preferred adamantane reactant material for the process comprises the alkyladamantane hydrocarbons of the $C_{12}$–$C_{19}$ range having one, two or three alkyl substituents, or their monools. The presence of alkyl groups on the nucleus of the feed material usually tends to reduce the solidification point of the resulting products and give them wider utility in traction fluid applications. The most preferred alkyladamantane reactant compounds are the hydrocarbons of the $C_{12}$–$C_{14}$ range and particularly the following: dimethyladamantanes, trimethyladamantanes, ethyladamantanes, methylethyladamantanes and dimethylethyladamantanes. Some specific examples of these and other hydrocarbons that can be used are as follows: adamantane; 1-methyladamantane; 2-methyladamantane; 1,2-, 1,3- and 1,4-dimethyladamantane; 1- and 2-ethyladamantanes; 1-ethyl-3-methyladamantane; 1-ethyl-4-methyladamantane; 1,2,4-, 1,2,5-, 1,3,4- and 1,3,6-trimethyladamantanes; 1-ethyl-2,4-dimethyladamantane; and 1-ethyl-3,6-dimethyladamantane. Illustrative examples of other starting hydrocarbons containing higher alkyl groups are: 1- and 2-butyladamantanes; 1-methyl-3-propyladamantane; 1,3-dimethyl-5-butyladamantane; 1-ethyl-2-methyl-5-hexyladamantane; 1-pentyl-4-methyladamantane; 1,3-diisobutyladamantane; n-hexyladamantanes; n-nonyladamantanes; and the like.

Any adamantanol corresponding to the hydrocarbons as above defined is also suitable as reactant material. The hydroxy group can be located at either a bridgehead or nonbridgehead position on the nucleus. Substantially the same results will be obtained regardless of the original position of the —OH radical on the nucleus, inasmuch as immediate isomerization of the —OH to an unsubstituted bridgehead position on the nucleus occurs in the presence of the strong sulfuric acid used in the process.

The other reactant in the process is $C_3$–$C_{20}$ paraffin hydrocarbon which can be normal paraffin, isoparaffin with certain limitations as to branching, or mixtures of such reactants. Whereas the n-paraffins themselves in the presence of strong sulfuric acid are normally inert and the isoparaffins are generally relatively inert, I have now discovered that they become quite reactive when the adamantane compound is also present and can readily function as an agent for alkylating the adamantane nucleus.

Any normal paraffin ranging from propane to eicosane or any mixture of these n-paraffins can be used in the process. When a higher molecular weight n-paraffin of the group herein defined is used, a reaction temperature in the upper part of the herein specified range preferably is employed and it may also be desirable to use higher strength acid of the range specified to increase the reaction rate. For preparing material for use in traction fluid compositions, n-paraffins of the $C_5$-$C_8$ range are particularly suitable reactants.

The isoparaffin reactants used are the $C_4$-$C_{20}$ range and should not be too highly branched as otherwise cracking thereof in the presence of the strong sulfuric acid becomes a predominant reaction. More particularly, the isoparaffin reactants are selected from the following: isobutane; isopentane; singly and doubly branched isohexanes; any singly branched $C_7$-$C_{20}$ isoparaffins; and any mixture of these. Thus the only doubly branched isoparaffins included are dimethylbutanes, viz. neohexane and 2,3-dimethylbutane. Mixtures of any of the foregoing isoparaffins with any of the $C_3$-$C_{20}$ n-paraffins can also be used. For the preparation of components of traction fluid compositions utilizing isoparaffins, those of the $C_5$-$C_8$ range are especially suitable.

Reaction of the adamantane hydrocarbon or monool feed material with the paraffin in accordance with the invention is effected by contacting a mixture of these reactants with strong sulfuric acid. The molar ratio of the adamantane compound to the paraffin can vary widely in the reaction mixture but usually will be in the range of 3.1 to 1:10. The ratio of acid to reactants can vary widely. Generally a volume excess of the acid relative to the reactants should be used and a volume ratio thereof in the range of 1:1 to 20:1 typically is employed. The mixture normally is an emulsion of acid and hydrocarbon phases, and the reaction takes place in the acid phase. The sulfuric acid should have a strength in the range of 96–105% $H_2SO_4$ equivalent by weight and more preferably 98–104% $H_2SO_4$. The reaction temperature can be from just above the freezing point of the acid used to about 100° C. and usually is in the range of 10–75° C. When a lower alkane such as propane, butane or isobutane is used as reactant, the reaction is conducted under sufficient pressure to maintain a substantial concentration of the alkane in the liquid phase.

Contact of the acid with the feed materials causes them to react in an unexpected manner, whereby the paraffin becomes an alkylating agent for the adamantane nucleus. Contacting of the mixture is continued until the desired reaction between the paraffin and the adamantane feed compound has been effected. The rate of reaction will depend upon the reaction temperature selected and the strength of the acid maintained in the reactor. Typical reaction rates are indicated by the data in specific examples hereinafter presented. Generally the contacting is continued until the adamantane compound has substantially all reacted.

When the adamantane feed compound is the hydrocarbon it slowly diffuses into the acid phase as the mixture is agitated, becoming solubilized therein probably at least mainly in the carbonium ion form. When the feed compound is a monool, it readily dissolves completely in the acid and again probably exists therein mainly in carbonium ion form. The paraffin reactant diffuses from the hydrocarbon phase into the acid phase in order to react and the rate that this occurs depends on the degree of agitation, the temperature and the molecular weight of the paraffin used. The alkylated adamantane products precipitate from the acid phase as they are formed and become constituents of the hydrocarbon phase.

During the reaction the oxidizing power of the strong acid employed results in the conversion of hydrogen atoms derived from hydrocarbon reactant material into water. Concurrently sulfur dioxide is formed from the acid and tends to vaporize from the mixture unless the reaction is carried out under pressure. When the strength of the acid is high (e.g. 102–105%| $H_2SO_4$), the reaction may occur so rapidly that the fast evolution of sulfur dioxide can present control problems unless the system is maintained under sufficient pressure. As water and sulfur dioxide are being formed, the strength of the sulfuric acid in the reaction mixture tends to decrease. This can be compensated for, if desired, by adding sulfur trioxide to the mixture as the reaction proceeds.

After the reaction has been completed, the acid phase is separated from the hydrocarbon phase and the latter is processed to recover the desired alkylation product. This product, as previously stated, generally includes alkylated adamantane hydrocarbon having one nucleus per molecule and one more alkyl group than was originally present as well as bis-type product having two adamantane nuclei per molecule linked through an alkylene radical. Both the additional alkyl group and the alkylene radical are derived from the paraffin reactant and each has the same number of carbon atoms as the paraffin employed. The hydrocarbon phase can be distilled to separate any unreacted paraffin and adamantane feed hydrocarbon from the alkylation products. The latter can, if desired, be distilled to separately recover each of the two types of alkylation products formed in the reaction.

If the reaction is not carried to completion, some adamantane reactant material will remain in the hydrocarbon phase and other such material will be left in the acid phase in the form of carbonium ions. The latter can be recovered as the corresponding monool by quenching the acid phase with water (ice) to say 20–40% $H_2SO_4$. This causes the monool to precipitate as an oily phase which can be separated. In some cases where the strength of the acid used is in the lower part of the range above specified, e.g., 96% $H_2SO_4$, a small amount of ketone derived from the adamantane reactant may also be present in the acid phase. Dilution of the acid likewise will cause it to precipitate along with any monool present. These compounds can be separated by distillation and the recovered monool can, if desired, be recycled for further conversion.

As a specific illustration of the invention, the reaction of n-pentane with 1,3-dimethyladamantane (DMA) is considered. This reaction is effected, for example, by contacting a mixture of DMA and n-pentane in a molar ratio of 1:2 with sulfuric acid having a strength of 100% $H_2SO_4$ at 50° C. for 10 hours. The acid and hydrocarbon layers are separated, the hydrocarbon layer is washed with water or aqueous alkali to remove residual acid, and the hydrocarbon material is then fractionally distilled to recover the products. The alkyladamantane product upon analysis is found to be composed mainly of the following (hydrogen atoms omitted for convenience):

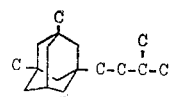

Specifically this product is 1,3-dimethyl-5-(3-methylbutyl) adamantane. Smaller amounts of isomeric product with the methyl branch in the $C_5$ alkyl substitutent positioned closer to the adamantane nucleus may also be produced, but the predominant isomer formed is the one shown. No isomer having an n-pentyl group is detected. A higher boiling bis-type product is also obtained and the major part thereof is found to correspond to the following structure:

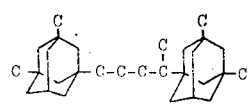

This compound specifically is 1,4-bis(3,5-dimethyladamantyl-1)-4-methylbutane. A minor amount of product which boils closely to this compound and appears to be isomeric thereto generally is also produced.

When a monool of DMA is used instead of the hydrocarbon, the same two hydrocarbon compounds as shown above are again obtained as the major products regardless of the original position of the hydroxy group on the nucleus. However, the reaction tends to proceed to completion more rapidly when the starting adamantane compound is a monool instead of the hydrocarbon. Also, if isopentane is substituted for n-pentane utilizing either DMA or a monool thereof as the other reactant, the same compounds are produced as reaction products, although some variations in yields may be experienced.

As another specific illustration of the invention, n-butane is used to alkylate 1-ethyladamantane (EA). First, n-butane is pressured into a stirred autoclave containing a batch of 20% oleum (104.5% $H_2SO_4$ equivalent) and the mixture is stirred to form an emulsion in which the volume ratio of the acid to n-butane is 7:1. The autoclave is provided with a reflux condenser and back-pressure control valve set for holding the pressure in the autoclave at about 7 p.s.i.g. Refluxing of the n-butane maintains the temperature in the autoclave at about 10° C. With the emulsion being agitated at this temperature, a stream of EA is slowly introduced until the molar ratio of EA:n-butane reaches 1:2. Thereafter the mixture is stirred for one hour, then the acid and hydrocarbon layers are separated, and the hydrocarbon layer is washed to remove residual acid. The alkyladamantane product is mainly the following:

Specifically this product is 1-ethyl-3(2-methypropyl) adamantane. A minor amount of the bis-type product, viz. 1,3-bis(3-ethyladamantyl-1)-3-methylpropane, is also obtained.

It is characteristic of the main products of the present process that, for any of the n-paraffins except propane, the alkyl and alkylene groups derived from the n-paraffin each will have a single methyl branch. Furthermore the methyl substituent in the alkyl group will be attached mainly or at least to substantial extent to the second carbon adjacent the unattached end of the chain, while that in the alkylene group will be attached mainly or at least to substantial extent to an alpha carbon atom in the chain. In other words at least a substantial proportion of the reaction products formed when using any $C_4$ or higher n-paraffin will have alkyl and alkylene groups which conform, respectively, to the following arrangements:

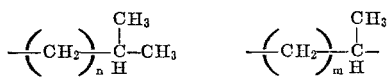

When n-paraffins of the $C_5$–$C_8$ range are used as reactant $n$ and $m$ in these formulas would be integers which are, respectively, 2 to 5 and 3 to 6. The presence of the methyl substituents in the alkyl and alkylene moieties of the reaction products is beneficial for utilization of the products as components of traction fluids, as the methyl branches tend to prevent crystallization and lower the solidification or pour points of the products.

When isoparaffin reactants as herein specified are used instead of the n-paraffins, the same structures as above described are again produced but different distributions of the possible isomers usually result. Even when the doubly branched hexanes (i.e. 2,3-dimethylbutane and neohexane) are used as feed material, at least substantial amounts of products having a single methyl substituent in the alkyl and alkylene groups, as above shown, are obtained.

Both types of alkylation products are usually obtained form the present reaction but the proportions thereof can vary considerably depending upon the particular reactants and conditions selected. As a general rule, formation of the bis-type product relative to the alkyladamantane is favored by conditions which tend to promote higher concentrations of carbonium ions derived from the starting adamantane compound in the acid phase, such as by higher acid concentrations and higer temperatures when an adamantane hydrocarbon reactant is used or by the use of a monool reactant instead of the adamantane hydrocarbon feed.

In some instances the alkyladamantane product will include a minor amount of material in which the new alkyl group on the nucleus does not have exactly the same number of carbon atoms as the paraffin reactant employed. In this material the new alkyl groups may differ by one to two carbon atoms from the starting paraffin. For example, when n-pentane or isopentane is used, a minor amount of product containing $C_4$ and $C_6$ alkyl groups may be obtained; or when the reactant is a $C_6$ paraffin, small amounts of alkyladamantanes which have $C_4$, $C_5$ and $C_7$ alkyl groups may appear in the product. All of these products are useful traction fluid components. It is believed that they come about as a result of disproportionation of the starting paraffin, followed by alkylation of the adamantane nucleus with the disproportionation products.

From the present process when utilizing one or more $C_{12}$–$C_{14}$ alkyladamantanes or alkyladamantanols and one or more $C_5$–$C_8$ n-paraffins, isoparaffins or both, a particularly desirable mixture can be recovered composed of a combination of the two types of alkylated adamantane products as above described. This constitutes a novel composition which has outstanding utility as a component of traction fluids. Both types of reaction products have unusually high traction coefficients as compared to most hydrocarbons. Also the fact that the mixture involves a plurality of hydrocarbons containing adamantane nuclei is advantageous, since the pour point is reduced and an intermediate viscosity level desired for various traction system applications is secured.

This novel composition suitable as a traction fluid component can be defined as a mixture of hydrocarbons containing adamantane nuclei and composed of a combination of the following:

(1) Alkyladamantane hydrocarbon material represented by QX wherein Q is a $C_{12}$–$C_{14}$ alkyladamantyl group with a bridgehead valence selected from dimethyladamantyl, trimethyladamantyl, ethyladamantyl, methylethyladamantyl and dimethylethyladamantyl and X is a $C_5$–$C_8$ alkyl group terminally attached at said valence, such alkyl group being substantially singly branched and including the structure

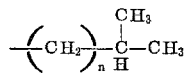

wherein $n$ is an integer of 2 to 5, and (2) Bis-type alkyladamantane material represented by QZQ wherein Q is as previously specified and Z is a $C_5$–$C_8$ alkylene group linking the Q's between bridgehead positions and at least substantially of the structure

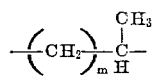

wherein $m$ is an integer from 3 to 6.

Friction or traction drive systems for the transmission of power have been described in numerous prior art references. See, for example, the following:

(1) Rounds, U.S. Pat. 3,394 603, dated July 30, 1968.
(2) Hamman et al., U.S. Pat. 3,411,369, dated Nov. 19, 1968.
(3) F. G. Rounds, J. of Chem. and Eng. Data, vol. 5, No. 4, pp. 499–507 (October 1960).
(4) Hewko, Round and Scott, Proceeding of the Symposium on Rolling Contact Phenomena, pp. 157–185, Elsevier Publishing Co., Amsterdam (1962).

As can be seen from these references, special properties are required of the traction fluids used in friction drive systems. One desired property is a high coefficient of traction as measured, for example, by the test procedure described in reference (3) supra. As shown therein most materials have traction coefficients (measured at a bearing speed of 600 ft./min.) less than 0.06, with the values for hydrocarbons usually falling in the range of 0.03–0.05. In comparison, both the alkyladamantane and the bis-type products of the present invention generally have traction coefficients measured in this manner in the neighborhood of 0.06 or higher. They are thus particularly valuable as additives for improving the traction coefficients of known types of traction fluid compositions. For example, the novel mixture of products defined above can advantageously be added to hydrogenated polybutene oil—a known traction fluid material as disclosed in the Rounds' patent cited above—to produce an excellent traction fluid composition.

The following examples illustrate the invention more specifically:

EXAMPLES 1–8

In each of these eight runs the reactants were n-hexane and 3,5-dimethyladamantanol-1 (referred to as "DMA-ol"), and 25 ml. of strong sulfuric acid (96% $H_2SO_4$ for Run 1 and 100% for Runs 2–8) were used. The procedure was as follows. The acid at the desired temperature in a flask was stirred by means of a magnetic stirrer and the DMA-ol was added in amount of 2.5 g. (0.0139 mole). As soon as the monool had dissolved n-hexane was added in a selected proportion and stirring was continued. For those runs in which the molar ratio of DMA-ol to n-hexane was 1:1, the amount of n-hexane used was 1.2 g. (0.0139 mole). At selected times 1 ml. portions of the reaction mixture were taken, diluted with water and then extracted with ethyl ether to recover all the products and unreacted material. The extracts were analyzed by GLC and identification of the components was carried out by using IR, NMR and mass spectroscopy. The results of this set of runs along with various run conditions are shown in Table I. The product compositions given do not include any unreacted n-hexane and are based on materials boiling above this reactant. Also the chromatographic charts indicated small amounts of alkylated material other than the main monoalkylation product ($C_6$-DMA) and probably resulting from the disproportionation reaction referred to above, but the amounts of these products were so small as to be negligible. The designation "DMA-one" appearing in Table I refers to the ketone of DMA, which product was formed to some extent to Run 1 only.

TABLE I.—REACTION OF n-HEXANE WITH DIMETHYLADAMANTANOL

| Run Number | DMA-ol/ n-C₆ | Acid strength, percent $H_2SO_4$ | Temperature, °C. | Time, hours | Product composition, percent | | | | | |
|---|---|---|---|---|---|---|---|---|---|---|
| | | | | | DMA | DMA-ol | DMA-one | $C_6$-DMA | Dimers and ethers | Bis-type product |
| 1 | 1:1 | 96 | 25–30 | 0.37 | 44.6 | 44.6 | 6.1 | | 4.7 | |
| | | | | 0.83 | 59.2 | 19.6 | 8.0 | | 9.2 | 4.0 |
| | | | | 1.25 | 57.1 | 12.7 | 8.9 | 2.3 | 9.5 | 9.5 |
| 2 | 1:1 | 100 | 25–30 | 1.00 | 44.9 | | | 31.4 | | 23.7 |
| 3 | 1:1 | 100 | 25–30 | 1.60 | 23.9 | | | 14.4 | | 61.7 |
| 4 | 1:1 | 100 | 10–15 | 3.50 | 30.4 | | | 31.2 | | 38.4 |
| 5 | 2:1 | 100 | 10–15 | 0.67 | 43.6 | 7.6 | | 2.7 | | 46.1 |
| | | | | 1.50 | 33.6 | 1.2 | | 9.7 | | 55.5 |
| 6 | 2:1 | 100 | 10–15 | 1.25 | 26.5 | | | 3.5 | | 70.0 |
| 7 | 1:10 | 100 | 10–15 | 0.05 | 64.1 | 23.1 | | | | 12.8 |
| | | | | 0.13 | 85.1 | 0.4 | | | | 14.5 |
| | | | | 0.23 | 74.9 | | | 3.6 | | 21.5 |
| 8 | 1:10 | 100 | 10–15 | 0.75 | 61.9 | | | 17.1 | | 21.0 |
| | | | | 1.00 | 60.8 | | | 19.2 | | 20.0 |
| | | | | 2.30 | 55.3 | | | 23.4 | | 20.1 |

The data in Table I show that both types of alkylated products can be made by reacting n-hexane with DMA-ol and that the yield of bis-type product tends to exceed that of the alkyladamantane ($C_6$-DMA) under most conditions shown for these reactants. Runs 5 and 6, in fact, show that with the monool to n-hexane ratio substantially above 1:1 most of the alkylated product can be made to be the bis-type material if desired. Run 1 shows that when the acid strength is at the lower end of the herein specified range, substantial amounts of by-products are obtained. One of these is dimethyladamantanone (DMA-one). Others are included together under the column designated "Dimers and Ethers." These are the types of products which have been shown in the aforesaid application Ser. No. 56,680 to be formed from DMA-ol in the absence of any n-paraffin reactant. The ether constituted the main part of this "Dimers and Ethers" component in Run 1. These products were not detected in any of Runs 2–8 in which stronger acid was used.

Table I also shows considerable amounts of dimethyladamantane (DMA) in the product. This indicates the interchangeability of DMA and DMA-ol as feed materials for the process. Further conversion of the DMA produced could be effected by continuing the reaction for suffiicient time in the presence of unconsumed n-hexane. In order to do this, the addition of $SO_3$ or fuming sulfuric acid to the reaction mixture might be necessary in order to maintain the strength of the acid above 96% $H_2SO_4$, since the acid strength drops as the reaction proceeds.

The structure of the $C_6$-DMA, product was identified by IR, NMR and mass spectroscopy as mainly the following isomer:

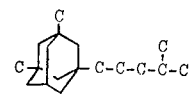

This compound had a boiling point of about 309° C. at 760 mm. Hg absolute. The $C_6$-DMA product also included minor amounts of several isomers of this compound. The bis-type product was considerably higher boiling and was found to be composed essentially of the following compound:

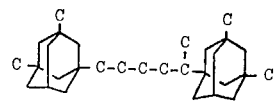

The C₆-DMA and the bis-type product were tested individually for traction coefficients and were found, respectively, to have coefficients of 0.060 and 0.061 by the Rounds' procedure at 600 ft./min. bearing speed. These values represent extraordinarily high traction coefficients for hydrocarbon materials.

Examples 9–11

Three runs were made under conditions similar to those of Runs 2 and 3 except that n-pentane was used in place of n-hexane. The other reactant again was DMA-ol. In these cases at the end of the reaction period, the mixture was settled to separate out the hydrocarbon phase and only the latter was analyzed. Results are shown in Table II, with compositions based on material boiling above the n-pentane.

stirred vigorously for 8 hours. After addition of the reactants, the temperature was allowed to rise and most of the reaction occurred at about room temperature. The reaction mixture was then extracted several times with n-pentane, and the combined extract layer was partially evaporated to remove about 75% of the solvent. The residue was passed through a column of alumina, and the effluent therefrom was then distilled to remove the rest of the pentane and to separately obtain the reaction products. Products obtained mainly were 23.9 g. of G₆-DMA and 16.2 g. of bis-type product. These amounts correspond to a total alkylate yield of about 29% based on the n-hexane charged. These products had the same structures as described for the products of Examples 1–8. Their traction coefficients were about 0.060–0.061 (Rounds' method, 600 ft./min. bearing speed). A blend TABLE II.—REACTION OF n-PENTANE WITH DIMETHYLADAMANTANOL

| | DMA-ol/ n-C₅ | Acid strength, percent H₂SO₄ | Temperature, °C. | Time, hours | Product composition, percent | | |
|---|---|---|---|---|---|---|---|
| | | | | | DMA | C₅-DMA | Bis-type product |
| Run Number: | | | | | | | |
| 9 | 1:1 | 100 | 25–30 | 2 | 40.2 | 41.0 | 18.8 |
| 10 | 1:1 | 100 | 25–30 | 5 | 39.5 | 41.5 | 19.0 |
| 11 | 1:1 | 100 | 25–30 | 24 | 37.5 | 43.4 | 19.2 |

From Table II it can be seen that in these runs the C₅-DMA predominated over the bis-type product. The C₅-DMA was found to be analogous to the main isomer of C₆-DMA product of Table I, being essentially the single isomer, 1-(3,5-dimethyladamantyl-1)-3-methylbutane. It had a boiling point of about 287° C. at 760 mm. Hg absolute. In these runs disproportionation of the n-pentane proably occurred to a small extent but the amounts of resulting C₄-DMA and C₆-DMA in the reaction products were practically negligible and not determined.

Examples 12–16

Five runs (12–16) were made similar to Runs 9–11 except that the reactants were 1,3-dimethyladamantane (DMA) and n-hexane. Only the hydrocarbon phases were analyzed in each run. Conditions for these runs and the results are shown in Table III. Again the amounts of any products resulting from the disproportionation reaction were small enough to be ignored.

of one part of each of these products with two parts of hydrogenated polyisobutylene made an excellent traction fluid base stock.

Example 18

Alkylation of DMA with n-pentane.—Another run was made in a manner similar to Example 17, using one liter of 100% H₂SO₄, 100 g. (0.61 mole) of DMA and 47 g. (0.65 mole) of n-pentane. The mixture was reacted for a total of 5 hours, following which the same recovery procedure was used as described for Example 17. Products obtained mainly were 16.7 g. of C₅-DMA and 7.5 g. of the bis-type product. The yield of total alkylate was about 17% based on the n-pentane charged.

Example 19

Alkylation of DMA with n-heptane.—This run was made in similar fashion to the preceding run, using one liter of 100% H₂SO₄, 100 g. (0.61 mole) of DMA and 61.5 g. (0.61 mole) of n-heptane. The reaction was car- TABLE III.—REACTION OF n-HEXANE WITH DIMETHYLADAMANTANE

| | DMA/ n-C₆ | Acid strength, percent H₂SO₄ | Temperature, °C. | Time, hours | Product composition, percent | | |
|---|---|---|---|---|---|---|---|
| | | | | | DMA | C₆-DMA | Bis-type product |
| Run Number: | | | | | | | |
| 12 | 1:1 | 100 | 10–25 | 0.5 | 90.5 | 3.6 | 5.9 |
| | 1:1 | 100 | 25–30 | 2.0 | 87.8 | 13.6 | 8.6 |
| | | | | 20.0 | 64.8 | 26.5 | 8.7 |
| | | | | 40.0 | 56.3 | 28.4 | 15.3 |
| 13 | 1:1 | 100 | 25–30 | 4.0 | 61.7 | 27.4 | 10.9 |
| 14 | 1:1 | 100 | 25–30 | 1.0 | 83.5 | 8.0 | 8.5 |
| | | | | 2.75 | 73.9 | 17.4 | 8.7 |
| | | | | 5.0 | 71.5 | 21.2 | 7.3 |
| 15 | 1:1 | 100 | 25–30 | 2.0 | 75.9 | 17.3 | 6.8 |
| | | | | 20.0 | 61.2 | 30.6 | 8.2 |
| | | | | 25.0 | 55.4 | 34.0 | 10.6 |
| 16 | 1:1 | 102 | 25–30 | 2.0 | 83.7 | 11.8 | 4.5 |

In each of Runs 12–16 the C₆-DMA and the bis-type products were essentially the same compounds as above described for the runs of Table I.

Example 17

Alkylation of DMA with n-hexane.—One liter of sulfuric acid (100% H₂SO₄) was added to a reactor provided with a stirrer and was chilled to about 10° C. DMA in amount of 90 g. (0.55 mole) and n-hexane in amount of 49.4 g. (0.57 mole) were added and the mixture was ried out for 5 hours and the product recovery was done in the same manner. Products obtained mainly were 18.0 g. of C₇-DMA which had a boiling point of about 330° C. at 760 mm. Hg absolute and 12.0 g. of the bis-type product. The yield of total alkylate was about 19% based on the n-heptane charged. Analysis showed that the C₇ group in the main isomer of the C₇-DMA had the structure

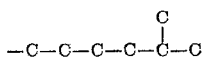

and the alkylene group in the bis-type product was largely

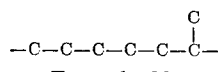

Example 20

Alkylation of DMA with n-octane.—This run was made in the same manner as the preceding run, using one liter of 100% $H_2SO_4$, 100 g. (0.61 mole) of DMA and 70.2 g. (0.61 mole) of n-octane. The reaction was carried out for a total of 5 hours. The product was composed mainly of 16.0 g. of $C_8$-DMA and 11.6 g. of the bis-type product. The total yield of alkylate was about 16% based on n-octane charged. The structures of these products were homologous to those of the corresponding products of Example 19 with one more methylene unit in the alkyl or alkylene chain.

Example 21

Alkylation of DMA with 3-methylheptane.—Another run was made in substantially the same manner as Example 20 except that 3-methylheptane was substituted in place of n-octane. The reaction proceeds somewhat faster in this case and gives products which are largely the same as those of the preceding example.

Examples 22-24

Four comparative runs were made in which various $C_6$ paraffins were used as reactant, these specifically being the following: n-hexane (Run 21); neohexane (Run 22); 3-methylpentane (Run 23); and 2,3-dimethylbutane (Run 24). In each run the paraffin reactant was added to a stirred mixture of DMA-ol (1.0 g.) and sulfuric acid (10 ml.) in amount such that the molar ratio of the two reactants was 1:1, and stirring was continued at 25–30° C. for one hour. In Runs 21–22 the strength of acid used was 100% $H_2SO_4$ while in Runs 23–24 it was 96% $H_2SO_4$. The mixture was then diluted with water (ice) and extracted with ether. The extract was analyzed, giving the results shown in Table IV. In addition to the usual analyses, an analysis of the $C_6$-DMA fraction of the product from each run for its isomer distribution was also made. This was done by trapping out the $C_6$-DMA fraction from a preparative chromatographic column and then analyzing same by means of a capillary chromatographic column (50 ft.).

TABLE IV.—REACTION OF VARIOUS $C_6$ PARAFFINS WITH DIMETHYL-ADAMANTANOL

DMA-ol/$C_6$-paraffin=1:1
Temperature=25–30° C.
Time=1 hour

| Run | 21 | 22 | 23 | 24 |
|---|---|---|---|---|
| $C_6$ paraffin used | n-Hexane | Neohexane | (¹) | (²) |
| Acid strength, percent $H_2SO_4$ | 100 | 100 | 96 | 96 |
| Product Composition, percent: | | | | |
| DMA | 26.3 | 27.7 | 53.4 | 33.5 |
| $C_4$-DMA | 1.2 | Trace | 1.9 | 5.5 |
| $C_5$-DMA | 3.5 | 0.6 | 3.4 | 3.6 |
| $C_6$-DMA | 26.3 | 24.3 | 23.7 | 37.2 |
| $C_7$-DMA | Trace | Trace | 3.6 | 3.9 |
| Bis-type products | 38.4 | 46.3 | 14.0 | 16.2 |
| Unidentified products | 4.3 | 1.1 | | |
| Composition of $C_6$-DMA fraction, percent: | | | | |
| Isomer 1 | 0.8 | 4.7 | 5.7 | 6.0 |
| Isomer 2 | 4.3 | 7.0 | 20.0 | 26.1 |
| Isomer 3 | 1.1 | 10.9 | 37.1 | 51.9 |
| Isomer 4³ | 52.6 | 43.5 | 11.8 | 7.3 |
| Isomer 5 | 41.2 | 33.9 | 25.4 | 5.7 |
| Isomer 6 | Trace | Trace | Trace | |

¹ 3-methylpentane.
² 2,3-dimethylbutane.
³ $C_6$ alkyl group of isomer 4 was —C—C—C—C̲—C (with C branch)

The data in Table IV show that substantially similar alkylation products can be made by using $C_6$ paraffins which are straight chain, singly branched or doubly branched, although the distribution of the various types of products can vary considerably. In each run minor amounts of alkylated DMA having a $C_4$, $C_5$ or $C_7$ alkyl group were obtained, illustrating that a minor amount of disproportionation of the paraffin starting material occurred. As shown, the $C_6$-DMA fractions include several isomers and the isomer which predominates varies depending upon the particular $C_6$-paraffin selected as feed. The $C_6$ group in these isomers is mainly singly branched with the branch being a methyl group and the isomers differing by its position. Isomer 4 was identified as the one with the methyl group on the carbon atom next to the unattached end. It is the predominant isomer in the case of n-hexane and neohexane.

Examples 25-26

These runs were made like the runs of Examples 21–24, except that n-pentane and isopentane were used in place of $C_6$-paraffin. Results are shown in Table V.

TABLE V.—REACTION OF $C_5$ PARAFFINS WITH DIMETHYL-ADAMANTANOL

DMA-ol/$C_5$-paraffin=1:1
Temperature=25–30° C.
Time=1 hour

| Run | 25 | 26 |
|---|---|---|
| $C_5$ paraffin used | n-Pentane | Isopentane |
| Acid strength, percent $H_2SO_4$ | 100 | 96 |
| Product Composition, percent: | | |
| DMA | 49.3 | 42.6 |
| $C_4$-DMA | 1.2 | 9.1 |
| $C_5$-DMA ¹ | 32.6 | 27.4 |
| $C_6$-DMA | 2.4 | 6.2 |
| Bis-type products | 13.4 | 14.0 |
| Unidentified products | 1.1 | 0.7 |

¹ The $C_5$ alkyl group was essentially 

The results given in Table V show that substantially the same products can be obtained using n-pentane or isopentane. Again minor amounts of products resulting from the disproportionation reaction are shown, with the amounts being somewhat larger when the branched paraffin is used.

When adamantane, adamantanol, other alkyladamantanes and other alkyladamantanols as hereindefined are substituted for the reactant adamantane compounds in the foregoing examples, analogous results are obtained. Likewise when other n-paraffins of the $C_4$–$C_{20}$ range are substituted for those employed in the examples above or when other isoparaffins as hereindefined are used, analogous alkyladamantane and bis-type products are produced mainly having one methyl branch in the new alkyl group and one in the alkylene group as heretofore explained. However when propane is used as the n-paraffin, the reaction proceeds in analogous fashion except that the $C_3$ alkyl and alkylene groups in the reaction products are unbranched. Both the alkyladamantane product and the bis-type products obtained in using such other reactants also have utility as components for traction fluid compositions.

Substantially equivalent results are also obtained when stronger sulfuric acid up to 105% $H_2SO_4$ is used in place of the acid employed in the foregoing examples. However, when the strength exceeds 102% $H_2SO_4$, the reaction has a tendency to proceed so fast that it may become uncontrollable at atmospheric pressure due to the rapid evolution of $SO_2$. Hence, in such case it is desirable to carry out the reaction in a closed system under pressure.

The invention claimed is:
1. Method of attaching a $C_3$–$C_{20}$ hydrocarbon moiety to the nucleus of an adamantane compound which comprises:
(A) contacting a mixture consisting essentially of
(1) sulfuric acid having a strength of 96–105% $H_2SO_4$,
(2) an adamantane compound reactant material selected from the group consisting of (a) saturated adamantane hydrocarbons of the $C_{10}$–$C_{19}$ range having 0–3 alkyl substituents, (b) adamantanols corresponding to said adamantane hydrocarbons and (c) mixtures thereof,

(3) and paraffin hydrocarbon selected from (a) $C_3$–$C_{20}$ normal paraffin hydrocarbons, (b) $C_4$–$C_{20}$ isoparaffins selected from isobutane, isopentane, singly and doubly branched isohexanes, and singly branched $C_7$–$C_{20}$ isoparaffins, and (c) mixtures thereof, at a reaction temperature above the freezing point of said acid but below 100° C. until at least substantial reaction between the paraffin and said adamantane compound has occurred;

(B) and thereafter recovering from the reaction mixture a hydrocarbon product containing at least one of the following products:

(1) alkylated adamantane hydrocarbon corresponding to said adamantane compound but having attached to a bridgehead position of the adamantane nucleus an alkyl group derived from and having the same number of carbon atoms atoms as said paraffin, and (2) bis-type hydrocarbon product comprising two adamantane nuclei derived from said adamantane compound and linked to each other between bridgehead positions through an alkylene group derived from and having the same number of carbon atoms as said paraffin.

2. Method according to claim 1 wherein said reactant material is selected from the group consisting of adamantane, methyladamantanes, dimethyladamantanes, trimethyladamantanes, ethyladamantanes, methylethyladamantanes, dimethylethyladamantanes and corresponding monools having the hydroxy group attached to the adamantane nucleus.

3. Method according to claim 2 wherein said paraffin hydrocarbon is a normal paraffin.

4. Method according to claim 3 wherein said adamantane compound is dimethyladamantane.

5. Method according to claim 3 wherein said normal paraffin is of the $C_5$–$C_8$ range.

6. Method according to claim 2 wherein said paraffin hydrocarbon is an isoparaffin.

7. Method according to claim 6 wherein said isoparaffin is of the $C_5$–$C_8$ range.

8. Method according to claim 1 wherein said reactant material comprises an alkyladamantane hydrocarbon of the $C_{12}$–$C_{19}$ range.

9. Method according to claim 8 wherein said paraffin hydrocarbon is a normal paraffin.

10. Method according to claim 9 wherein said alkyladamantane hydrocarbon is of the $C_{12}$–$C_{14}$ range.

11. Method according to claim 8 wherein said paraffin hydrocarbon is an isoparaffin.

12. Method according to claim 11 wherein said alkyladamantane hydrocarbon is of the $C_{12}$–$C_{14}$ range.

13. Method according to claim 8 wherein the acid concentration is in the range of 98–104% $H_2SO_4$.

14. Method according to claim 1 wherein said reactant material comprises an alkyladamantanol of the $C_{12}$–$C_{19}$ range.

15. Method according to claim 14 wherein said paraffin hydrocarbon is a normal paraffin.

16. Method according to claim 15 wherein said alkyladamantanol is of the $C_{12}$–$C_{14}$ range.

17. Method according to claim 1 wherein from the reaction mixture there is recovered a mixture of said alkylated adamantane hydrocarbon and bis-type hydrocarbon product.

18. Method according to claim 17 wherein said reactant material is alkyladamantane hydrocarbon of the $C_{12}$–$C_{14}$ range and said paraffin hydrocarbon is of the $C_5$–$C_8$ range.

19. A mixture of hydrocarbons containing adamantane nuclei and suitable as a traction fluid component which comprises a combination of:

(A) alkyladamantane hydrocarbon material represented by QX wherein Q is a $C_{12}$–$C_{14}$ alkyl adamantyl group with a bridgehead valence selected from dimethyladamantyl, trimethyladamantyl, ethyladamantyl, methylethyladamantyl and dimethylethyladamantyl and X is a $C_5$–$C_8$ alkyl group terminally attached at said valence, such alkyl group being substantially singly branched and including the structure $$-\left(CH_2\right)_n-\underset{H}{\overset{CH_3}{C}}-CH_3$$

wherein $n$ is an integer of 2 to 5, and (B) bis-type alkyladamantane material represented by QZQ wherein Q is as previously specified and Z is a $C_5$–$C_8$ alkylene group linking the Qs between bridgehead positions and at least substantially of the structure $$-\left(CH_2\right)_m-\underset{H}{\overset{CH_3}{C}}-$$

wherein $m$ is an integer from 3 to 6.

References Cited

UNITED STATES PATENTS

| | | | |
|---|---|---|---|
| 3,546,308 | 12/1970 | Moore | 260—666 M |
| 3,560,578 | 2/1971 | Schneider | 260—666 M |
| 3,382,288 | 5/1968 | Schneider | 260—666 M |

DELBERT E. GANTZ, Primary Examiner

V. O'KEEFE, Assistant Examiner